Jan. 12, 1954
R. T. BLAKELY
2,666,150
CRYSTAL TETRODE
Filed May 4, 1950
2 Sheets-Sheet 1
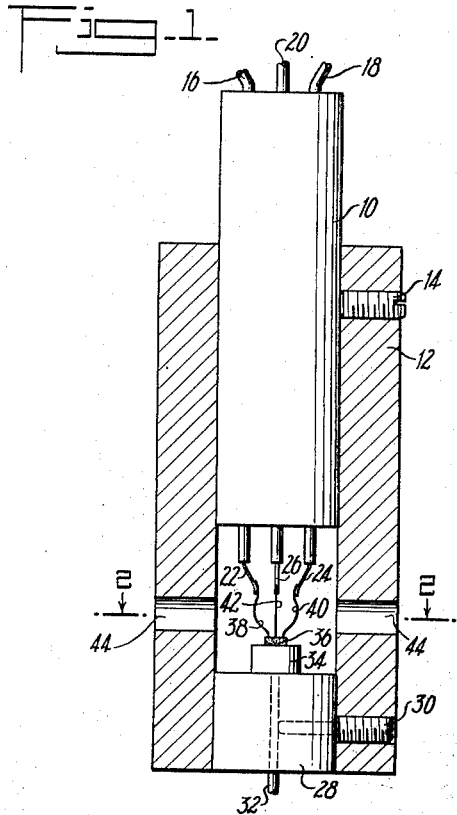
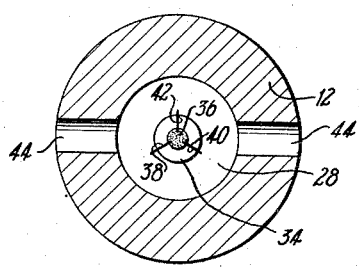
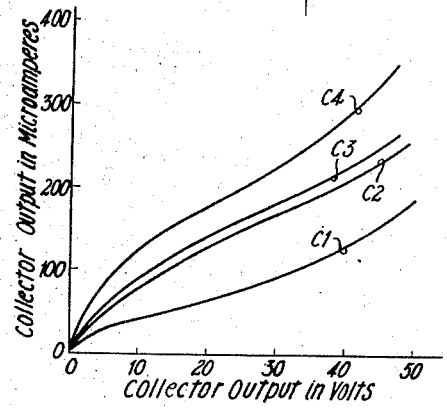
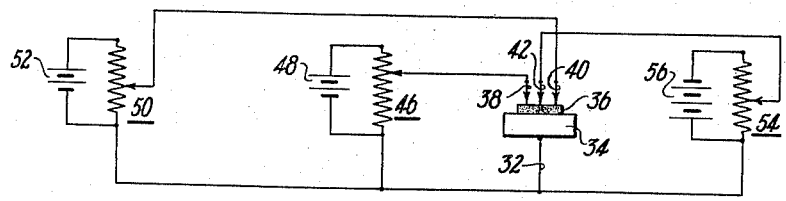
INVENTOR
*ROBERT T. BLAKELY*
BY
*Dwight D. Mooney*
AGENT

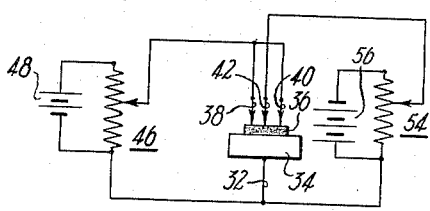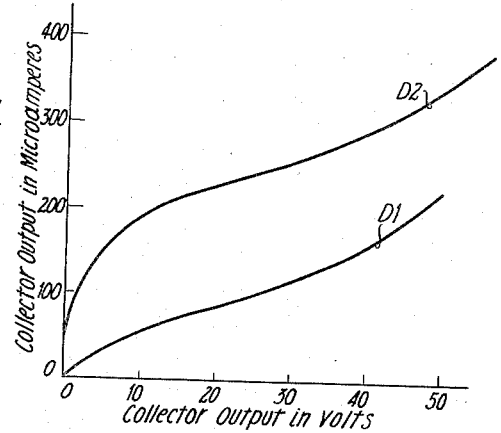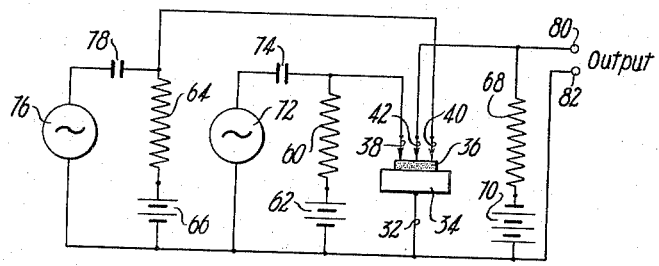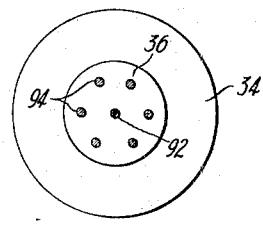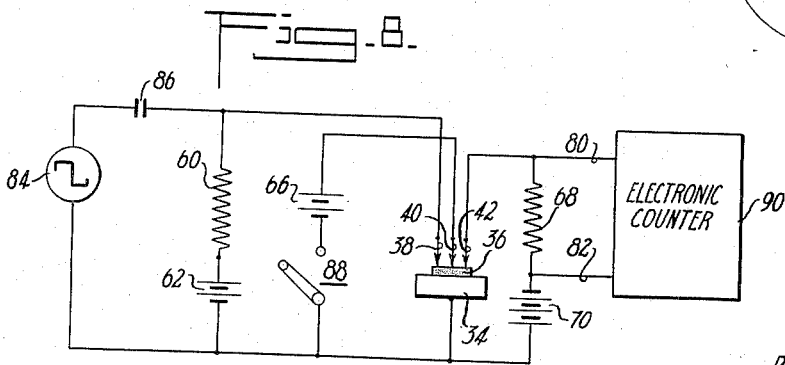

Patented Jan. 12, 1954

2,666,150

UNITED STATES PATENT OFFICE 2,666,150

CRYSTAL TETRODE

Robert T. Blakely, Lagrange, N. Y., assignor to International Business Machines Corporation, New York, N. Y., a corporation of New York Application May 4, 1950, Serial No. 159,963

1 Claim. (Cl. 307—88)

This invention relates to semi-conductors and more particularly to a novel crystal tetrode having a plurality of electrodes of the same functional type.

A conventional crystal triode or transistor includes two electrodes of the whisker type, each having a diameter of a few thousandths of an inch. One of these whisker electrodes is termed the emitter electrode and the other is termed the collector electrode. A third electrode termed the base electrode is of a relatively large area and is connected by any suitable means, such as solder, to one face of the crystal to form a good electrical connection therewith. The two whisker electrodes are placed a few thousandths of an inch apart on another face of the crystal and when properly biased a mutual influence occurs which permits the device to be used as an amplifier. The emitter electrode is the input electrode and the collector electrode is the output electrode. Shortcomings of the conventional crystal triode are that a single such device will not independently respond to a plurality of inputs or produce a plurality of outputs.

It is a principal object of the invention to provide a novel crystal tetrode which eliminates the above shortcomings.

Another object is to provide a crystal tetrode having a plurality of input electrodes and a single output electrode so that a single output is controlled by multiple inputs.

Other objects of the invention will be pointed out in the following description and claim and illustrated in the accompanying drawings, which disclose, by way of examples, the principle of the invention and the best mode, which has been contemplated, of applying that principle.

In the drawings:

Fig. 1 is an isometric view partly in cross section showing one way to mount the novel crystal tetrode of the invention, Fig. 2 is a cross sectional view of the device of Fig. 1 along the line 2—2 shown in Fig. 1, Fig. 3 is a circuit diagram including the novel crystal tetrode of the invention, Fig. 4 is a graph illustrating the operation of the circuit of Fig. 3, Fig. 5 is a circuit diagram showing a connection of the novel crystal tetrode where a plurality of emitter electrodes are responsive to a common input circuit, Fig. 6 is a graph illustrating the operation of the circuit diagram of Fig. 5, Fig. 7 is a circuit diagram showing a connection of the crystal tetrode for use as a mixer or modulator.

Fig. 8 is a circuit diagram showing the crystal triode connected to operate as a gating device, and Fig. 9 is a top view of the crystal triode illustrating a further novel arrangement of electrodes.

Referring more particularly to Figs. 1 and 2 the insulating plug 10 is frictionally secured within the cylindrical tube 12 by set screw 14. Conductive rods 16, 18 and 20 are secured within plug 10 by any suitable means and terminal strips 22, 24 and 26 respectively are secured to the protruding lower end of the respective rods. Plug 28 is secured within the tube 12 by the set screw 30 which also secures the lead 32, extending through the plug and connected to the lower face of the base electrode 34, in place against the plug 28. A crystal 36 is affixed by any suitable means, such as solder, to the other face of the base electrode 34. Three cat whiskers 38, 40 and 42 are fixedly secured at one end to the lower end of the terminal strips 22, 24 and 26 respectively. A cylindrical hole 44 is provided as shown in the casing 12. The plug 28 is moved within the casing 12 until the whiskers 38, 40 and 42 are positioned on the upper face of the crystal approximately 120° apart so that the three electrical point contacts formed define an equilateral triangle. The sides of this equilateral triangle are approximately 0.002 inch in length. The plug 28 is then secured in place by tightening set screw 30. Each whisker is formed into a bend to provide a suitable pressure against the face of the crystal thereby ensuring a good electrical contact.

Referring to Fig. 3 there is shown a novel circuit arrangement of the crystal tetrode wherein conduction through a single output circuit is controlled by either of two input circuits. Parallel connected potentiometer 46 and battery 48 are connected between the emitter electrode 38 and base electrode 34 so that an adjustable bias voltage can be applied to the emitter 38. Similarly, parallel connected potentiometer 50 and battery 52 are connected between the emitter electrode 40 and base electrode 34. These circuits connected to the emitter electrode 38 and 40 comprise the input circuits for the crystal triode.

The output circuit comprises the parallel connected potentiometer 54 and battery 56 which are connected between the collector electrode 42 and base electrode 34 so that an adjustable bias voltage can be applied to the collector.

As seen from the circuit arrangement the emitter electrodes 38 and 40 are biased in a positive or forward direction so that D. C. current flows into the crystal 36. The collector electrode 42 is biased in a negative or reverse direction with a higher voltage than the bias voltage on the emitters 38 and 40 so that a small D. C. current flows through the collector electrode.

It is well known in the crystal triode art that current through the collector electrode of a crystal triode is sensitive to and may be controlled by changes of current through the emitter electrode. A change of the bias voltage on the emitters 38 and 40 may be effected by adjustment of the arm of the respective potentiometers 46 and 50 to change the current through the respective emitters. If the collector bias voltage is kept constant the increase in collector current may be larger than the increase in emitter current. This increase of the collector current over the increase of the emitter current is attributed to the fact that current through a crystal triode is carried by excess or conduction electrons and defect electrons or positive carriers normally referred to as holes. These positive carriers or holes are attracted by the field of the collector current. The current concentrations and mobility of electrons and holes between the emitter and collector electrodes are affected, among other things, by impurities in the crystal, bias voltage, the temperature, electrode spacing, and the extent of the pressure exerted at the point contact between the crystal and the electrodes.

Fig. 4 is a graph illustrating the output characteristic of the novel crystal tetrode shown in Fig. 3. The output voltage in volts at the collector electrode is plotted along the abscissa and the output current in microamperes at the collector is plotted along the ordinate. The lower curve designated C1 is obtained when the potentiometers 46 and 50 are adjusted so that the bias voltage on each of the emitters 38 and 40 is 0 volt. After these adjustments are made the arm of the potentiometer 54 is moved in step-by-step fashion to obtain the curve.

The curve C2 is similarly obtained when the bias voltage on the emitter 38 is 0 volt and the bias voltage on the emitter 40 is 1.0 volt. Curve C3 is obtained when the bias voltage on the emitter 38 is 1.0 volt and the bias voltage on the emitter 40 is 0 volt. Obviously, with the symmetry of the circuit arrangement, the curves C2 and C3 should theoretrically coincide. The fact that they do not actually coincide is attributed mainly to the probable variation in the pressure of the point contact between the crystal and various electrodes. The curve C4 is similarly obtained when the bias voltage on each of the emitter electrodes is 1.0 volt, the curves C2 and C3 have a greater slope than the curve C1 and the curve C4 has a greater slope than the curves C2 and C3 thereby indicating a larger output current for a given output voltage as the bias voltage on either or both emitter electrodes is increased. Hence, the output of the crystal tetrode is controlled by either or both of the input circuits each of which controls the bias voltage of a different one of the emitter electrodes.

Referring to Fig. 5, the input circuit comprising the parallel connected potentiometers 46 and battery 48 are commonly connected to the emitters 38 and 40. The physical arrangement of the electrodes relative to the crystal 36 are as illustrated in Fig. 2. The crystal tetrode is effectively used as a crystal triode since the commonly connected emitters are energized from a single input circuit. However, a much larger output is obtained from the collector electrode than is obtained from the conventional crystal triode using a single emitter of the whisker type. This increased output is attributed to the fact that the fields of a plurality of emitters simultaneously effect conduction to the collector.

Fig. 6 is a graph similar to Fig. 4 and illustrating the output characteristic of the circuit of Fig. 5. The curve D1 is obtained when the bias voltage on the emitters 38 and 40 is 0 volt and the curve D2 is obtained when the bias voltage on the emitters is 1.0 volt. The curves D1 and D2 are substantially parallel over a considerable span of their length. The curve D2 shows near its origin a sharp increase in the output current as the output voltage is gradually increased and also indicates a much higher output current than that obtained when the bias voltage on the emitter is 0 volt as shown by the curve D1.

Referring to Fig. 7, the resistor 60 in series with battery 62, resistor 64 in series with battery 66, and resistor 68 in series with battery 70 are connected to supply the desired bias voltage to the emitter 38, emitter 40 and collector 42, respectively. An alternating current source 72 in series with capacitor 74 is connected across the resistor 60 and battery 62 so that an A. C. signal is applied to the emitter 38. Similarly, an A. C. current source 76 in series with the capacitor 78 is connected across the resistor 64 and battery 66 so that an A. C. signal is applied to the emitter 36. The output appears across terminals 80 and 82. Obviously the battery 66 may be short circuited without changing the performance of the circuit, since proper adjustment of the source 76 will provide a self-biasing action for the emitter 36. One of the principal advantages of the crystal tetrode mixer of the invention is that the interaction between the input circuits is very low. As a result, the signal impressed on each emitter has little tendency to be transmitted to the other emitter. It was conclusively shown that the crystal tetrode will function as a mixer and retain the advantages pointed out above while performing this function. It is pointed out as an example only that a signal having a frequency of 50,000 C. P. S. may be impressed on one emitter and a signal having a frequency of 400 C. P. S. may be impressed on the other emitter.

Referring to Fig. 8 the emitters 38 and 40 and the collector 42 are again arranged on the face of the crystal 36 to form an equilateral triangle. A square wave generator 84 in series with a capacitor 86 are connected in parallel with the resistor 60 and battery 62 to supply square wave pulses to the emitter 38. A switch 88 is connected in series with the battery 66 so that when the switch is closed a positive bias voltage is applied to the emitter 40 and when it is opened that emitter is at 0 bias voltage. The output voltage across resistor 68 is transferred by the leads 80 and 82 to an electronic counter 90 which may be of any conventional type such as a series of chain connected trigger circuits well known in the art and energized by negative pulses.

As is well known, when the bias voltage on the emiter 40 is 0 volt (switch 88 opened as shown) and the emitter 38 is positively biased, the application of positive square waves to the emitter 38 by the generator 84 causes a negative square wave output from the negative biased collector 42 to appear across the output leads 80 and 82. However, this output is insufficient to effect operation of the conventional electronic counter 84. When the switch 88 is closed and the emitter 40 is also positively biased the voltage level of the square wave output is shifted in a negative direction.

This voltage shift is attributed at least in part to a change in the impedance of the output circuit. This change in the impedance of the output circuit is effected by the change in the impedance of the crystal 36 caused by the application of the positive bias voltage to the emitter 40. The square wave output caused by the application of the square waves to the emitter 38 from the generator 84 when the emitter 40 is positively biased because of the closing of the switch 88 is sufficient to energize the counter 84. While the switch 88 is included in the circuit arrangement to effect a change in the bias voltage on the emitter 40 it is obvious that a manual or automatic means may be employed to effect a change in this bias voltage. It is pointed out merely by way of example that this bias voltage may be controlled by a record card to effect a counting of timed pulses during any preselected portion of the card cycle.

Referring to Fig. 9 the top view of the crystal 36 mounted on base electrode 34 illustrates a novel emitter and collector arrangement. The whisker 92 is centrally located in electrical contact with the face of the crystal 36 and the six whiskers designated 94 are spaced equidistant from the whisker 86 and 60° from each other relative to the whisker 92. It is understood that the angular spacing of the whiskers 94 is not critical and that a smaller or larger number of whiskers may be provided without changing the principle of operation. Either the whisker 92 or the whiskers 94 may be used as an emitter or collector. Hence, the electrode arrangement is readily adaptable to produce a single output from a multiple input or a multiple output from a single input. Obviously, the whiskers 94 may be connected to form a single emitter or collector and provide an output many times that of the conventional crystal triode having a single emitter and a single collector each making point contact with the crystal.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed:

A circuit including a semi-conductor of the crystal type having a base electrode connected to the crystal; a plurality of input electrodes of the whisker type arranged in electrical contact with the crystal; an output electrode of the whisker type arranged in electrical contact with the crystal and in spaced relation with said input electrodes; circuit means connected between said base and output electrode and responsive to a predetermined output voltage swing, said voltage swing being imposed upon a critical direct voltage; first voltage means connected between said base electrode and at least one of said input electrodes for impressing said voltage swing on said circuit means, said voltage swing being imposed upon a direct voltage less than said critical direct voltage; and second voltage means connected between said base electrode and at least one other of said input electrodes for impressing said voltage swing on said circuit means, said voltage swing being imposed upon said critical direct voltage caused by an automatic shift in the direct voltage in response to a change in the impedance of said crystal, said change in the impedance being caused by said second voltage means.

ROBERT T. BLAKELY.

References Cited in the file of this patent
UNITED STATES PATENTS

| Number | Name | Date |
|---|---|---|
| 2,476,323 | Rack | July 19, 1949 |
| 2,519,763 | Hoglund | Aug. 22, 1950 |